United States Patent
Aggarwal et al.

(10) Patent No.: US 9,152,776 B2
(45) Date of Patent: Oct. 6, 2015

(54) SECURE ACCESS-BASED ENUMERATION OF A JUNCTION OR MOUNT POINT ON A CLUSTERED SERVER

(71) Applicant: NetApp, Inc., Sunnyvale, CA (US)

(72) Inventors: Amit Aggarwal, Mathura (IN); Shekhar Amlekar, Nagpur (IN)

(73) Assignee: NetApp, Inc., Sunnyvale, CA (US)

( * ) Notice: Subject to any disclaimer, the term of this patent is extended or adjusted under 35 U.S.C. 154(b) by 112 days.

(21) Appl. No.: 13/873,819

(22) Filed: Apr. 30, 2013

(65) Prior Publication Data

US 2014/0325640 A1  Oct. 30, 2014

(51) Int. Cl.
    *G06F 12/00* (2006.01)
    *G06F 21/31* (2013.01)

(52) U.S. Cl.
    CPC ........ *G06F 21/31* (2013.01); *G06F 2221/2107* (2013.01); *G06F 2221/2111* (2013.01); *G06F 2221/2141* (2013.01)

(58) Field of Classification Search
    USPC .................. 711/112, 114; 707/756, 790, 705; 726/5, 18
    See application file for complete search history.

(56) References Cited

U.S. PATENT DOCUMENTS

| | | | |
|---|---|---|---|
| 6,119,131 A * | 9/2000 | Cabrera et al. ......................... 1/1 |
| 6,671,773 B2 * | 12/2003 | Kazar et al. .................... 711/112 |
| 6,968,345 B1 | 11/2005 | Muhlestein |
| 7,409,494 B2 * | 8/2008 | Edwards et al. ............... 711/114 |
| 7,668,881 B1 * | 2/2010 | Hoffmann et al. ............ 707/756 |
| 7,933,921 B2 | 4/2011 | Ellard |
| 7,979,416 B1 | 7/2011 | Santry et al. |
| 7,987,167 B1 * | 7/2011 | Kazar et al. .................... 707/705 |
| 8,041,735 B1 * | 10/2011 | Lacapra et al. ................ 707/783 |
| 8,312,046 B1 * | 11/2012 | Eisler et al. .................... 707/790 |
| 2005/0193221 A1 * | 9/2005 | Yoneyama .................... 713/201 |
| 2005/0246401 A1 * | 11/2005 | Edwards et al. .............. 707/205 |
| 2006/0080370 A1 * | 4/2006 | Torii et al. ..................... 707/204 |
| 2007/0022091 A1 * | 1/2007 | Styles et al. ....................... 707/2 |
| 2007/0043757 A1 * | 2/2007 | Benton et al. ................. 707/102 |
| 2010/0281214 A1 * | 11/2010 | Jernigan, IV ................. 711/114 |

OTHER PUBLICATIONS

Eisler, et al., Data ONTAP GX: A Scalable Storage Cluster, FAST '07: 5th USENIX Conference on File and Storage Technologies, USENIX Technologies, 2007, pp. 139-152.

Gupta, NetApp Storage Systems in a Microsoft Windows Environment, Technical Report 3367 (TR-3367), Apr. 2011, 31 pages.

* cited by examiner

*Primary Examiner* — Joseph P Hirl
*Assistant Examiner* — Sayed Beheshti Shirazi
(74) *Attorney, Agent, or Firm* — Cesari and McKenna, LLP (57) ABSTRACT

Embodiments described herein provide a technique for securely responding to an enumeration request of a data container stored at a location referenced by a junction or mount point within a share served by a storage system. To that end, the technique applies access permissions of the data container at the referenced location instead of permissions that may reside at the junction or mount point. Upon determining that the permissions are insufficient to allow access to the data container, the technique ensures that a descriptor of the junction or mount point is not included in a response to the enumeration request.

20 Claims, 7 Drawing Sheets

VIEW FROM USER1, ABE OFF    VIEW FROM USER1, ABE ON    VIEW FROM USER2, ABE ON

SECURE ACCESS-BASED ENUMERATION OF A JUNCTION OR MOUNT POINT ON A CLUSTERED SERVER

BACKGROUND

1. Technical Field

The present invention relates to storage systems and, more particularly, to access-based enumeration of shared resources in such systems.

2. Background Information

A storage system typically includes one or more storage devices, such as disks, into which information may be entered, and from which information may be obtained, as desired. The storage system may also include a storage operating system that may implement a high-level module, such as a file system, to logically organize the information stored on the disks as a hierarchical structure of data containers, such as files and directories. In addition, the storage system may be configured to operate according to a client/server model of information delivery to thereby allow many clients to access the data containers stored on the system. Each client may request the services of the storage system by issuing messages (in the form of packets) to the system using storage (e.g., file-based) access protocols, such as the conventional Common Internet File System (CIFS) protocol.

To facilitate client access to the information stored on the storage system, the storage operating system typically exports units of storage, e.g., (CIFS) shares. As used herein, a share is equivalent to a mount point or shared storage resource, such as a folder or directory that stores information about files or other directories served by the system. A client access feature of the storage system may be to provide an ordered listing or "enumeration" of data containers within a share, or a portion of the share, served by the storage system. Typically, a client issues an enumeration request on behalf of a user to solicit enumeration of the data containers within a directory of the share. In response, the storage system returns a list of descriptors for those data containers included in the directory specified in the enumeration request. The response typically contains only those descriptors for which the user making the enumeration request has sufficient access permission.

Conventionally, access permission is determined per export unit, e.g., per share, as a property of the whole share. Consequently, a user with permission to access the share may have sufficient permission to view a descriptor of any file or folder served by the share, even if that user has insufficient permission to access the files or folders themselves. Security problems may arise for enumeration requests when descriptors of files and folders are visible to a user who doesn't have sufficient permission to access those files and folders. For example, the name of a file or folder may describe confidential information, such as the name of a customer or a new product under development. To remedy this problem, access permission may be determined using access-based enumeration (ABE), which lists descriptors of enumerated data containers based on a user's access permission to those data containers. A user without sufficient permission to access a data container is deemed to have insufficient permission to access a descriptor of the data container.

A further security problem arises with access-based enumeration of junctions or mount points. As used herein, a junction or mount point is an identifier that redirects access to a data container to a storage location referenced by the junction rather than the location containing the junction or mount point; however, permission to access the data container may appropriately reside at the reference location. For example, the administrator may alter the access permission of the data container at the reference location leaving any permission stored at the location of the junction or mount point unaltered. Failure to apply the appropriate user access permission of the data container at the reference location, in response to an enumeration request, may result in a security breach in which a descriptor of a junction or mount point is provided to a user with insufficient permission to access the contents of the data container referenced by that junction or mount point. The problem may be compounded when further indirection is employed, such as when a junction references a data container at another storage location and that data container includes another junction that references yet another data container at yet another storage location, and so on.

Accordingly, there remains a need for a method and system for secure access-based enumeration of junctions or mount points on a server.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Embodiments described herein provide a technique for securely responding to an enumeration request of a data container stored at a location referenced by a junction or mount point within a share served by a storage system. To that end, the technique applies access permissions of the data container at the referenced location instead of permissions that may reside at the junction or mount point. Upon determining that the permissions are insufficient to allow access to the data container, the technique ensures that a descriptor of the junction or mount point is not included in a response to the enumeration request.

Although implementation of the secure enumeration response technique may be useful within any storage system, the embodiments described herein are illustratively implemented within a clustered storage system. In one embodiment, a protocol layer in a storage system of the cluster may be modified to receive a client enumeration request for the share, e.g., a directory, using a file-based protocol. In response, the protocol layer may initiate performance of a file system operation to obtain a list of descriptors of data containers, including junctions and mount points, within the directory. This list of descriptors may then be pruned or amended using access-based enumeration of junction or mount point type entries within the list, prior to returning the amended list in response to the client enumeration request. In accordance with the technique, the access-based enumeration for each junction or mount point type entry in the descriptor list is performed by making an access-based enumeration of the data container referenced by the junction or mount point. Where the client has insufficient permission to access the referenced data container, the descriptor of the respective junction or mount point is removed from the list of descriptors.

Illustratively, for each junction descriptor within the list, the protocol layer employs a junction table to obtain a file handle to a data container referenced by the junction descriptor. For each obtained file handle, the module creates a lookup request that includes the file handle for the data container referenced by the junction. Each lookup request is sent to a file system executing on the storage system of the cluster that is configured to serve the respective data container. The lookup request may also include user credentials of the client making the enumeration request and an access-based enumeration (ABE) flag instructing the file system to perform an access permission check on the data container for the given user credential. In response to the lookup request, the file system compares the data container access permission to the user credential by applying an ABE permission mask. The ABE permission mask defines a set of permissions that allow access to the data container. A result from the comparison indicating whether the client has permission to access to the data container is returned by the file system to the protocol layer, in response to the lookup request. When the returned lookup request indicates an access denied, the protocol layer removes the descriptor (i.e., associated by indirection with the data container) for the junction or mount point from the list of descriptors intended as a response to the client enumeration request. Thus, for each returned lookup request indicating an access denied, the descriptor list is amended to remove the junction descriptor associated with the respective junction or mount point. The module then returns the amended list of descriptors to the client in the response to the user enumeration request.

DESCRIPTION

A. Cluster Environment

Figure 1:
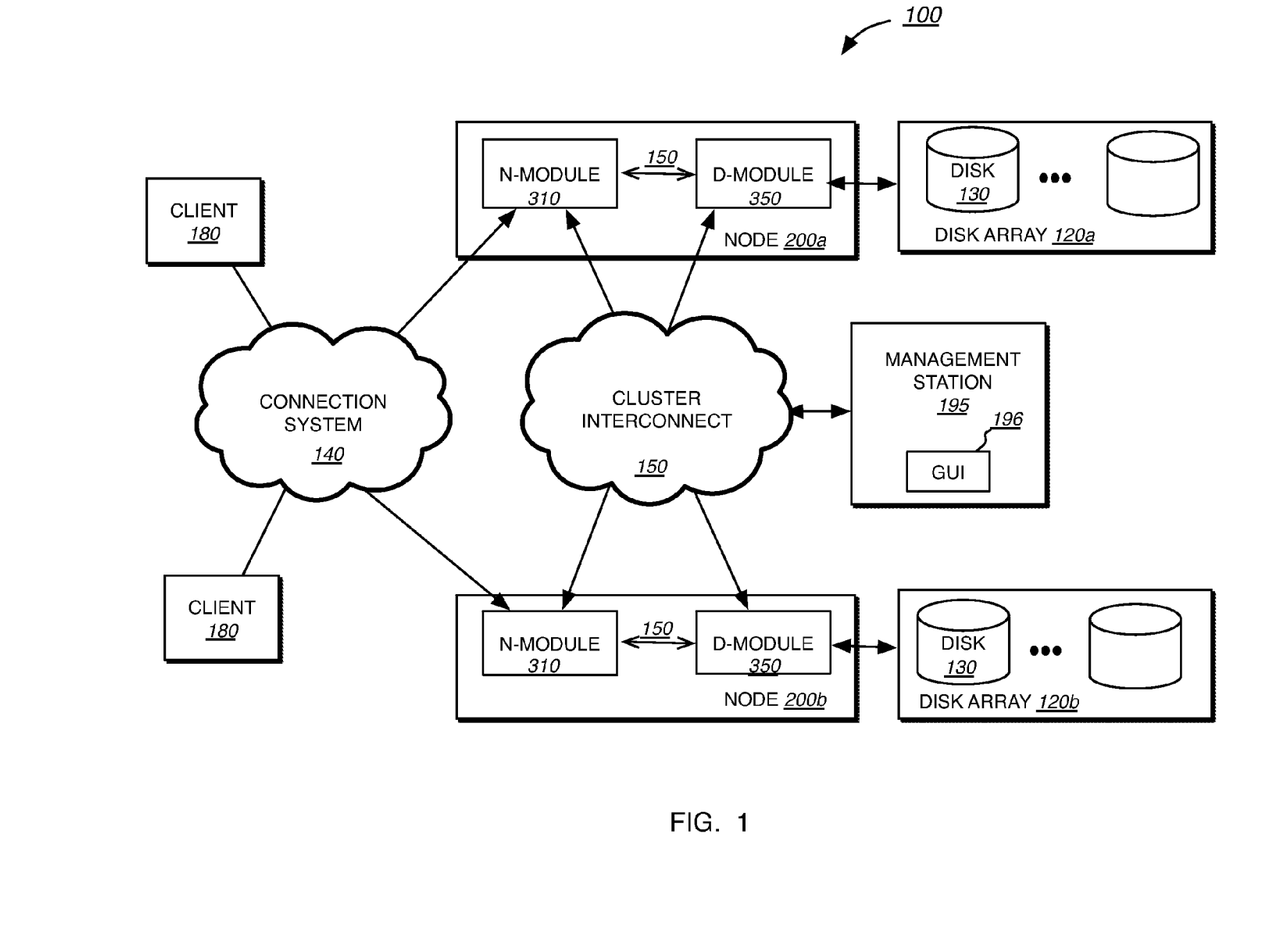
FIG. 1 is a schematic block diagram illustrating a plurality of nodes interconnected as a cluster.

FIG. 1 is a schematic block diagram of a plurality of nodes 200a,b interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a connection system 140, which may be a computer network, and with other N-modules over a cluster interconnect 150 and alternatively over connection system 140, while each D-module 350 connects to one or more storage devices, such as disks 130 of a disk array 120. The nodes 200 are interconnected by the cluster interconnect 150 which, in the illustrative embodiment, may be embodied as a Gigabit Ethernet switch or the like. An exemplary distributed file system architecture is generally described in U.S. Pat. No. 6,671,773 titled METHOD AND SYSTEM FOR RESPONDING TO FILE SYSTEM REQUESTS, by M. Kazar et al. issued Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client 180, by exchanging packets over the connection system 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories.

B. Storage System Node

Figure 2:
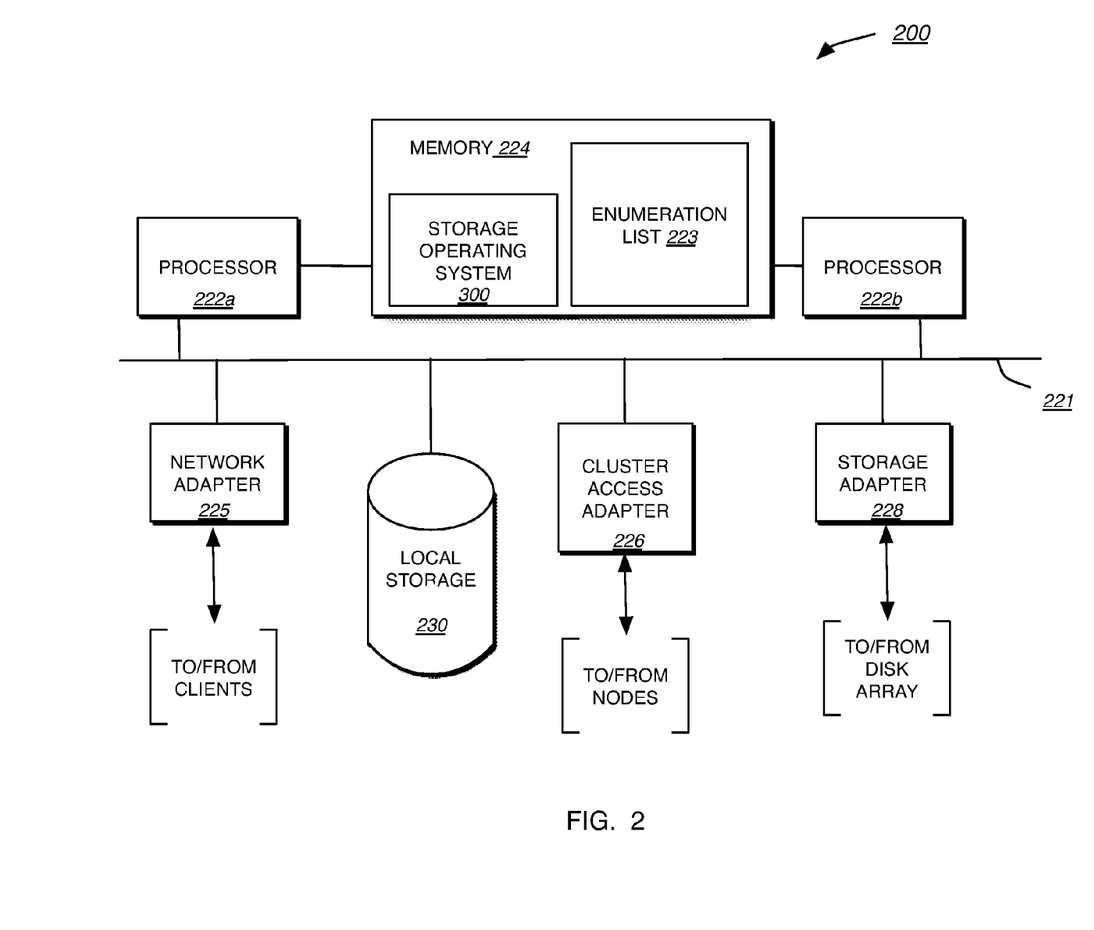
FIG. 2 is a schematic block diagram illustrating a node.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 221. The local storage 230 comprises one or more storage devices, such as disks, utilized by the node to locally store configuration information, e.g., a copy of a storage operating system 300. The cluster access adapter 226 comprises a plurality of ports adapted to couple the node 200 to other nodes of the cluster 100. Each node 200a may communicate with another node 200b by exchanging discrete frames or packets of data according to pre-defined protocols, such as TCP/IP. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing storage operating system 300 that preferably implements a high-level module, such as a file system, to logically organize the information as a hierarchical structure of named data containers, such as directories, files and special files, e.g., on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350; however, in an alternate embodiment, the N/D-modules may be implemented as pieces of code within a single operating system process that may execute dynamically across one or more processors 222a,b.

The memory 224 includes a plurality of storage locations addressable by the processors 222a,b and/or adapters 225, 226, 228 for storing software programs (e.g., processes and/ or services) and data structures (e.g., enumeration list 223)

associated with the embodiments described herein. The processors and adapters may, in turn, include processing elements and/or logic circuitry configured to execute the software programs and manipulate the data structures. Storage operating system 300, portions of which are typically resident in the memory 224 and executed by the processors 222a,b, functionally organizes the node 200 by, inter alia, invoking operations in support of the software processes and/or services executing on the node. It will be apparent to those skilled in the art that other processing and memory means, including various computer readable media, may be used for storing and executing program instructions pertaining to the embodiments described herein.

The network adapter 225 comprises a plurality of ports adapted to couple the node 200 to one or more clients 180 over a connection system 140, which may include point-to-point links, wide area networks, wireless networks, and virtual private networks implemented over a public network (Internet) or a shared local area network. The network adapter 225 thus may comprise the mechanical, electrical and signaling circuitry needed to connect the node 200 to the network. Illustratively, the connection system 140 may be embodied as an Ethernet network or a Fibre Channel (FC) network. Each client 180 may communicate with the node 200 over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as optical, magneto-optical, magnetic tape, bubble memory, storage class memory, flash memory, electronic random access memory, micro-electro mechanical and any other similar media adapted to store information, including data and parity information. However, as illustratively described herein, the information is preferably stored on the disks 130 of array 120. The storage adapter 228 comprises a plurality of ports having input/output (I/O) interface circuitry that couples to the disks 130 over an I/O interconnect arrangement, such as a conventional high-performance FC link topology.

Storage of information on each disk array 120 may be implemented as storage "volumes" that illustratively comprise a collection of physical storage disks 130 cooperating to define an overall logical arrangement of a volume block number (vbn) space on the volume(s). Each logical volume is generally, although not necessarily, associated with its own file system. Alternatively, a plurality of arrays 120 may be aggregated into a larger logical volume. Aggregates and logical volumes are disclosed and described in U.S. Pat. No. 7,409,494 titled EXTENSION OF WRITE ANYWHERE FILE SYSTEM LAYOUT to John K. Edwards et al. and issued on Aug. 5, 2008. Briefly, an aggregate includes one or more groups of disks, such as Redundant Array of Independent (or Inexpensive) Disks (RAID) groups, that are apportioned by the storage operating system 300 into one or more virtual volumes of the storage system. Each such virtual volume has its own logical properties, utilizes algorithms of the storage operating system implementation and serves storage objects, such as files with different file types and formats. An example of a file type of a storage object is a volume that may be exported as a file system, e.g., to a client 180. The disks within a logical volume/file system are typically organized as one or more groups, wherein each group may be operated as a Redundant Array of Independent (or Inexpensive) Disks (RAID). An illustrative example of a RAID implementation is a RAID-4 level implementation, although it should be understood that other types and levels of RAID implementations or data redundancy techniques may be used in accordance with the inventive principles described herein.

It should be noted that in another alternate embodiment of the invention, the processing elements of adapters 225, 226, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware, software, or combinations thereof.

C. Storage Operating System

Figure 3:
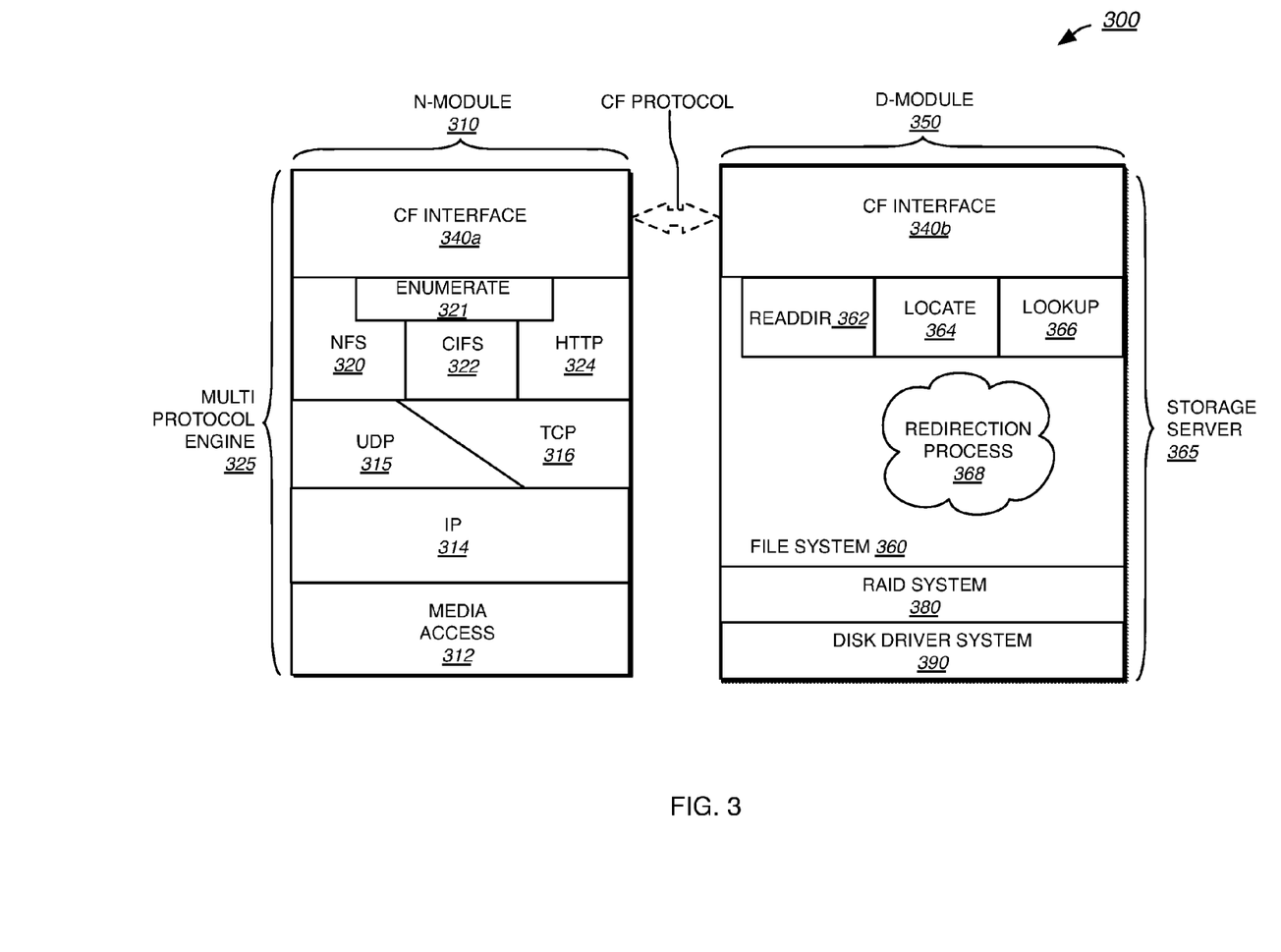
FIG. 3 is a schematic block diagram illustrating a storage operating system.

To facilitate access to the disks 130, the storage operating system 300 illustratively implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored.

In the illustrative embodiment, the storage operating system is preferably the NetApp® Data ONTAP® operating system available from Netapp, Inc., Sunnyvale, Calif. that implements a Write Anywhere File Layout (WAFL®) file system. However, it is expressly contemplated that any appropriate storage operating system may be enhanced for use in accordance with the principles described herein. As such, where the term "WAFL" is employed, it should be taken broadly to refer to any storage operating system that is otherwise adaptable to the teachings of the disclosure herein.

FIG. 3 is a schematic block diagram of the storage operating system 300 that may be advantageously used with one or more embodiments described herein. The storage operating system 300, portions of which are typically resident in memory 224 and executed by the processors 222a,b functionally organizes the node 200 by, inter alia, invoking storage operations in support of the storage service implemented by the node.

The storage operating system may comprise a series of software layers organized to form an integrated network protocol stack or, more generally, a multi-protocol engine 325 that provides data paths for clients 180 to access information stored on the node 200 using block and file access protocols, e.g. iSCSI and NFS protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A protocol layer provides multi-protocol file access and, to that end, illustratively includes support for the NFS protocol 320 and the CIFS protocol 322.

In addition, the storage operating system may include a series of software layers organized to form a storage server 365 that provides data paths for accessing information stored on the disks 130 of the node 200. To that end, the storage server 365 may include a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 is illustratively a message-based system that provides logical volume management capabilities for use in access to the information stored on the storage devices, such as disks. The file system 360 illustratively implements WAFL having an on-disk format representation that is block-based using, e.g., 4 kilobyte (kB) blocks and using index nodes ("inodes") to identify data containers (such as files or directories) and file attributes (such as creation time, access permissions, size and block location). Illustratively, access permissions are stored in an access control list including one or more access control entries each associated with security identifier (SID) as commonly used in a CIFS environment. In addition, access permissions may have a user identifier (UID) and/or a group identifier (GID), such as typically used by NFS. Access permissions are described in further detail in commonly owned U.S. Pat. No. 7,668,881 titled SYSTEM AND METHOD FOR ASSOCIATING NIS ATTRIBUTES WITH CIFS CLIENTS to Hoffmann et al., issued Feb. 23, 2010.

The file system 360 may use files to store meta-data describing the layout of its on-disk file system; these meta-data files include, among others, an inode file. A data container handle, i.e., an identifier that includes an inode number, is used to retrieve an inode from disk.

The protocol layers, e.g., the NFS layer 320 and CIFS layer 322, of the N-module 310 function as protocol servers that translate file-based requests from clients into CF protocol messages used for communication with the D-module 350. That is, the N-module servers convert the incoming data access requests into file system primitive operations (commands) that are embedded within CF messages by the CF interface module 340*a,b* for transmission, e.g., over cluster interconnect 150, to the D-modules 350 of the cluster 100. Notably, the CF interface modules 340*a,b* cooperate to provide a single file system image across all D-modules in the cluster 100. Thus, any network port, e.g., an interface on network adaptor 225, of an N-module 310 that receives a client request can access any data container within the single file system image located on any D-module 350 of the cluster 100. The CF protocol is illustratively a generic file and/or block-based protocol that comprises a collection of methods/functions constituting a CF application programming interface (API). Examples of such an agnostic CF protocol are the SpinFS and SpinNP protocols available from Netapp, Inc. details of which are described in the aforementioned U.S. Pat. No. 6,671,773, titled METHOD AND SYSTEM FOR RESPONDING TO FILE SYSTEM REQUESTS to M. Kazar et al.

D. Junctions, Mount Points, and Symlinks

In addition to distributing the volumes served by the cluster 100 among the nodes 200 of the cluster 100, an administrator may relocate the volumes or data containers stored on the volumes among any of the nodes 200 in the cluster. However, it is desirable to allow a client 180 to still access the relocated data container using a data container handle associated with the prior location. In order to ensure that relocation of the data container is transparent to the client, the administrator may employ a redirection identifier that indicates to the file system 360 that the requested data container is not stored at the original storage location identified by the data container handle. The administrator may manage redirection identifiers by issuing commands at a management station 195. For example, the administrator can enter a command to create a redirection identifier for a particular volume either through a graphical user interface (GUI) 196 or through a command line interface (CLI), or the like. In an alternative embodiment, one or more of the clients 180 may act as the management station 195.

An example of a redirection identifier is a junction that is associated with a storage location and that indicates that data is not stored at an originally-used location but is available at another storage location. Essentially, the junction provides a level of indirection between a storage system and a client 180 accessing a data container served by the cluster 100.

To facilitate client 180 access to the information stored in the cluster, the node typically exports units of storage, e.g., (CIFS) shares. As used herein, a share is equivalent to a mount point or shared storage resource, such as a folder or directory that stores information about files or other directories served by the cluster. For example, a client may access information in the directory by mounting the share and issuing a CIFS protocol access request that specifies a uniform naming convention (UNC) path to the share. The UNC path or pathname is an aspect of a storage networking environment that defines a way for a client to refer to a unit of storage on the cluster. The UNC pathname specifies resource names on a network. For example, a UNC pathname may comprise a server name, a share (directory) name, and a path descriptor that collectively reference a unit of storage or share. Resolution of the server name is usually required to access the share, i.e., the client typically requires knowledge of the specific physical location (i.e., the identity) of the server exporting the share. Thus, an additional form of redirection identifier is a mount point to a share on another volume.

Figure 4A:
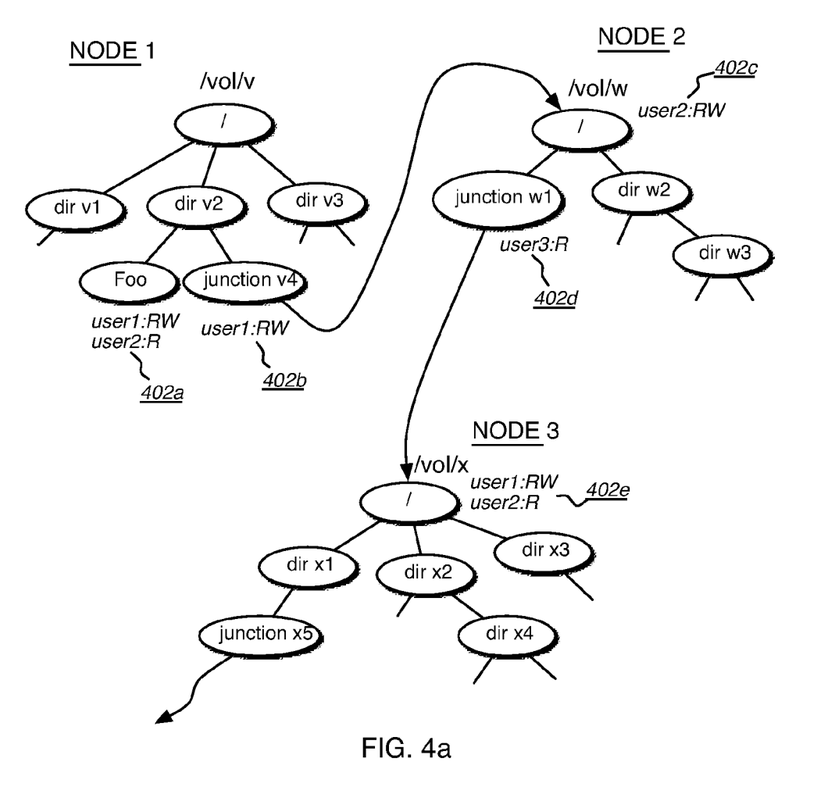
FIG. 4a is schematic block diagram illustrating an embodiment of a file system that may be used with secure access-based enumeration.
Figure 4B:
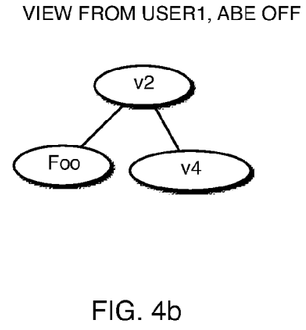
FIGS. 4b-d are schematic block diagrams illustrating the embodiment in FIG. 4a as viewed from a user.

FIG. 4*a*. is a schematic block diagram illustrating an example of a namespace 400 that may be advantageously used with the present invention. A junction acts as mount point for another volume "vol/w", so that the volumes "/vol/v" and "/vol/w" form a unified namespace 400 accessible by the client 180. Depending on the access permissions, various users may view differently the same portions of the namespace as illustrated, for example, in FIGS. 4*b-d*. Notably, a namespace may be viewed when the storage server 365 has access-based enumeration (ABE) activated (turned-on) or deactivated (turned-off).

Figure 4C:
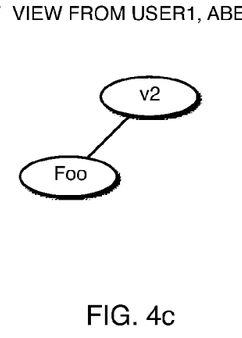

ABE permission to view a portion of a namespace 400, e.g. a hierarchy of data containers, may be determined from an access permission for each data container beneath a directory rooting that portion of the namespace hierarchy. For, example, FIG. 4*b*. illustrates a user ("user1") view of the namespace 400 from the directory ("dir v2") when ABE is turned-off. The "user1" is permitted to view the contents of junction "v4" (i.e., "root /vol/w" referenced by the "junction v4") because permission 402*b* ("user1:RW") allows it. Here, file "Foo" with access permission 402*a* ("user1:RW; user2:R") is also visible to "user1." However, with ABE turned-on, as illustrated in FIG. 4*c*., "user1" cannot view "v4" because the access permission 402*c* ("user2:RW") of the referenced data container ("root /vol/w") has no access permission for "user1."

Figure 4D:
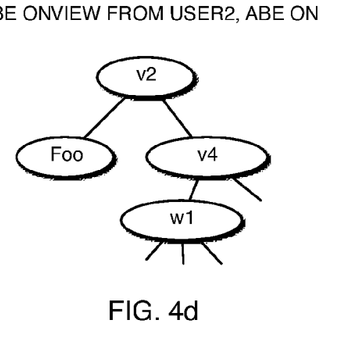

Even further indirection may be employed, such as when the namespace 400 contains yet more junctions in the hierarchy, which may visible only to some users. For example, FIG. 4*d* illustrates namespace 400 as viewed from "user2" with ABE turned-on where a junction "w1" with access permission 402*d* ("user3:R") is nevertheless visible to "user2" because the access permission 402*e* ("user1:RW; user2:R") of the data container ("vol/x") referenced by the junction "w1" allows "user2" to view "w1." In this example, "user3"

may view "w1" only when ABE is turned-off, in which case access permission 402d ("user3:R") is applied instead of access permission 402e. Notably, in this case (ABE turned-off), "user2" cannot view "w1."

Junctions are described in further detail in commonly owned U.S. Pat. No. 8,312,046 titled SYSTEM AND METHOD FOR ENABLING A DATA CONTAINER TO APPEAR IN A PLURALITY OF LOCATIONS IN A SUPER-NAMESPACE to Eisler et al., which issued on Nov. 12, 2012 (the contents of which are incorporated herein by reference in entirety).

An other example of a redirection identifier that may provide a level of indirection, i.e., with respect to a data container served by a storage server, is a symbolic link. A symbolic link ("symlink") is a data structure that, instead of representing the name of data container, such as a file or directory, provides a path descriptor (such as a UNC path name) to that data container. Some file system implementations, such as the Microsoft NTFS file system, permit a symlink path descriptor to reference a data container located on a volume different from that containing the symlink, which are commonly called wide symlinks (Microsoft also refers to these type of symlinks as "junctions"). A technique for utilizing wide symlinks to provide a further level of indirection in this manner for the storage server 365 is described in commonly owned U.S. Pat. No. 6,968,345 titled TECHNIQUE TO ENABLE SUPPORT FOR SYMBOLIC LINK ACCESS BY WINDOWS CLIENTS to Muhlestein, which issued on Nov. 22, 2005.

E. Enumeration Request

Figure 5:
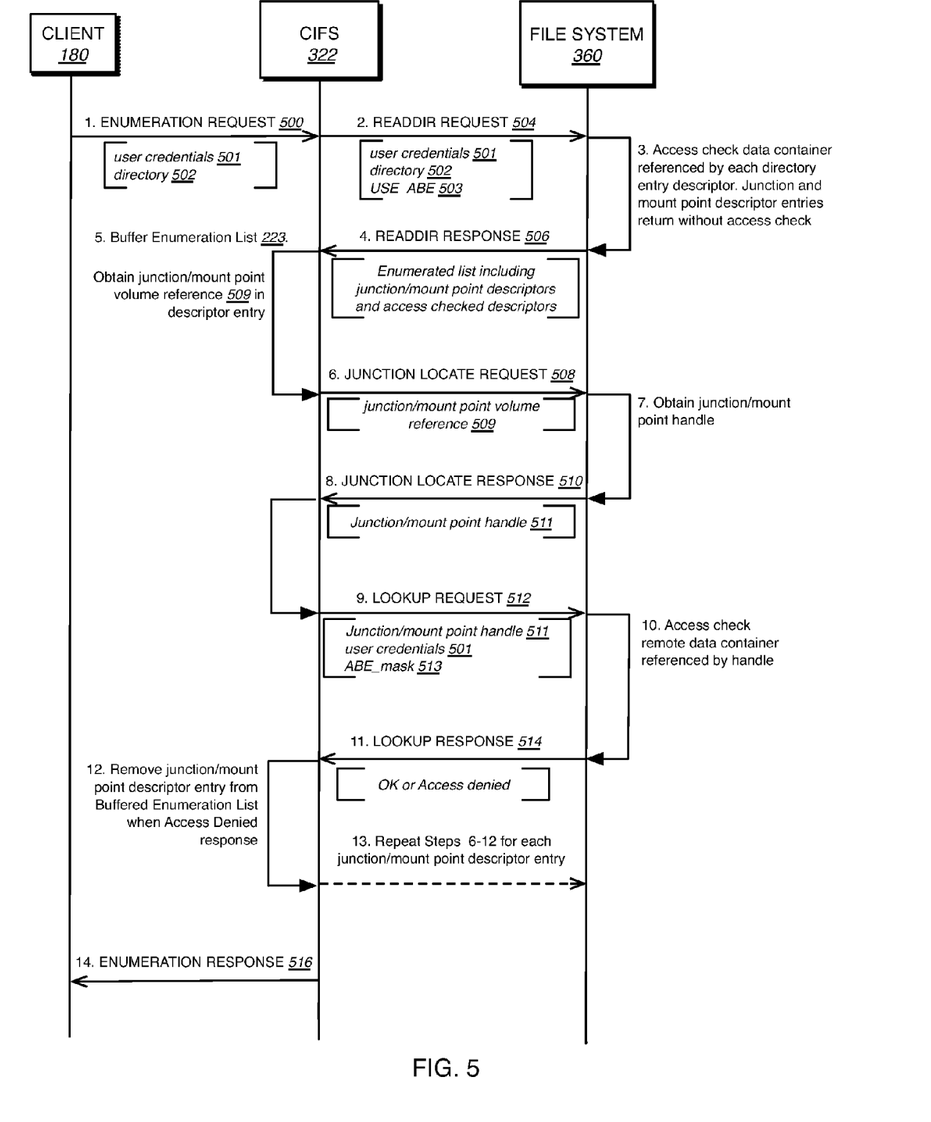
FIG. 5 is a sequence diagram illustrating a flow of information in response to a directory enumeration request.

FIG. 5 is a sequence diagram illustrating a flow of information in response to an enumeration request, e.g., a directory enumeration request, in accordance with one or more embodiments herein. A client 180 issues an enumeration request using file access protocol, e.g., CIFS or NFS, to cluster 100 (e.g., directed to a node 200 in the cluster 100 over the connection system 140). Illustratively, a CIFS enumeration request includes a TRANS2_FIND_FIRST request or TRANS2_FIND_NEXT request for Server Message Block (SMB) version 1 and SMB2_COM_QUERY_DIRECTORY request for SMB version 2 (detailed in the "Common Internet File System (CIFS) Technical Reference, version 1" available from the Storage Networking Industry Association). An example of an NFS enumeration request is READDIR (detailed in Internet Engineering Task Force Request for Comment 1813 and 3530 available from http://www.ietf.org).

An enumeration request 500 typically includes a directory 502 and user credential 501. User credentials may include a SID for a CIFS enumeration request or a UID and/or GID for an NFS enumeration request. The appropriate protocol layer of the N-module 310, e.g., CIFS 320, receives the enumeration request 500 for further processing. An enumerate module 321 issues a read directory (READDIR) 504 request processed by the file system READDIR module 362. The READDIR request 504 may also include an indicator, e.g., a USE_ABE 503 flag, instructing the file system 360 to perform ABE enumeration when processing the request. The file system 360 returns a READDIR RESPONSE 506 having an enumerated list of descriptors corresponding to data containers within the directory 502. The response 506 may include descriptors for redirection identifiers, e.g., junctions or mount points or wide symlinks, but not descriptors for data containers referenced by those redirection identifiers. The list of descriptors is buffered in memory 224 as an enumerated list 223, illustratively embodied as a list or an array data structure.

Each redirection identifier descriptor in the enumerated list 223 has a data container that it references, i.e., a volume reference 509. The enumerate module 321 examines each descriptor entry in the enumeration list 223 and for each redirection identifier (e.g., junction, mount point or wide symlink) issues a JUNCTION LOCATE REQUEST 508 having the respective volume reference 509 to the file system 360 so as to obtain a handle to the data container referenced by the redirection identifier. The file system module LOCATE 364 responds with the handle contained in a JUNCTION LOCATE RESPONSE 510. The protocol layer, e.g., CIFS 322, then issues a LOOKUP REQUEST 512, again to the file system 360. The LOOKUP REQUEST 512 has the handle 511, a user credential 501 (received from the client 180) and a permissions mask, ABE_mask 513. The file system module LOOKUP 514 processes this request by performing an access check on the data container for the handle 511, i.e. the data container referenced by the indirection identifier. Alternatively, a REDIRECTION PROCESS 368 may be used to redirect the LOOKUP REQUEST 512 via the cluster interconnect 150 to another node 200 servicing the data container for the handle 511. The file system 360 returns an "access denied" response when the user credential 501 has insufficient permission to access the data container associated with the handle 511. For each "access denied", e.g., illustratively embodied as an integer identified as ACCESS DENIED, received by the protocol layer, i.e., the enumerate module 321, in response to the LOOKUP REQUEST 512, the descriptor associated the indirection identifier referencing the data container associated with the handle 511, is removed from the enumeration list 223. Once all the indirection identifier descriptors in the READDIR RESPONSE 506 are processed, the contents of the amended enumeration list 223 are returned to the client 180 in response to the enumeration request 500.

The ABE_mask 513 illustratively includes a bit-mapped mask of permissions sufficient to satisfy an access-based enumeration of a data container for which access-based enumeration is sought. Illustratively, for Windows NT the ABE_mask 513 includes a bit map logical OR of special permissions SYNCHRONIZE, LIST_DIRECTORY, READ_EA, READ_ATTRIBUTES, and READ_CONTROL.

F. Protocol Stack

Figure 6:
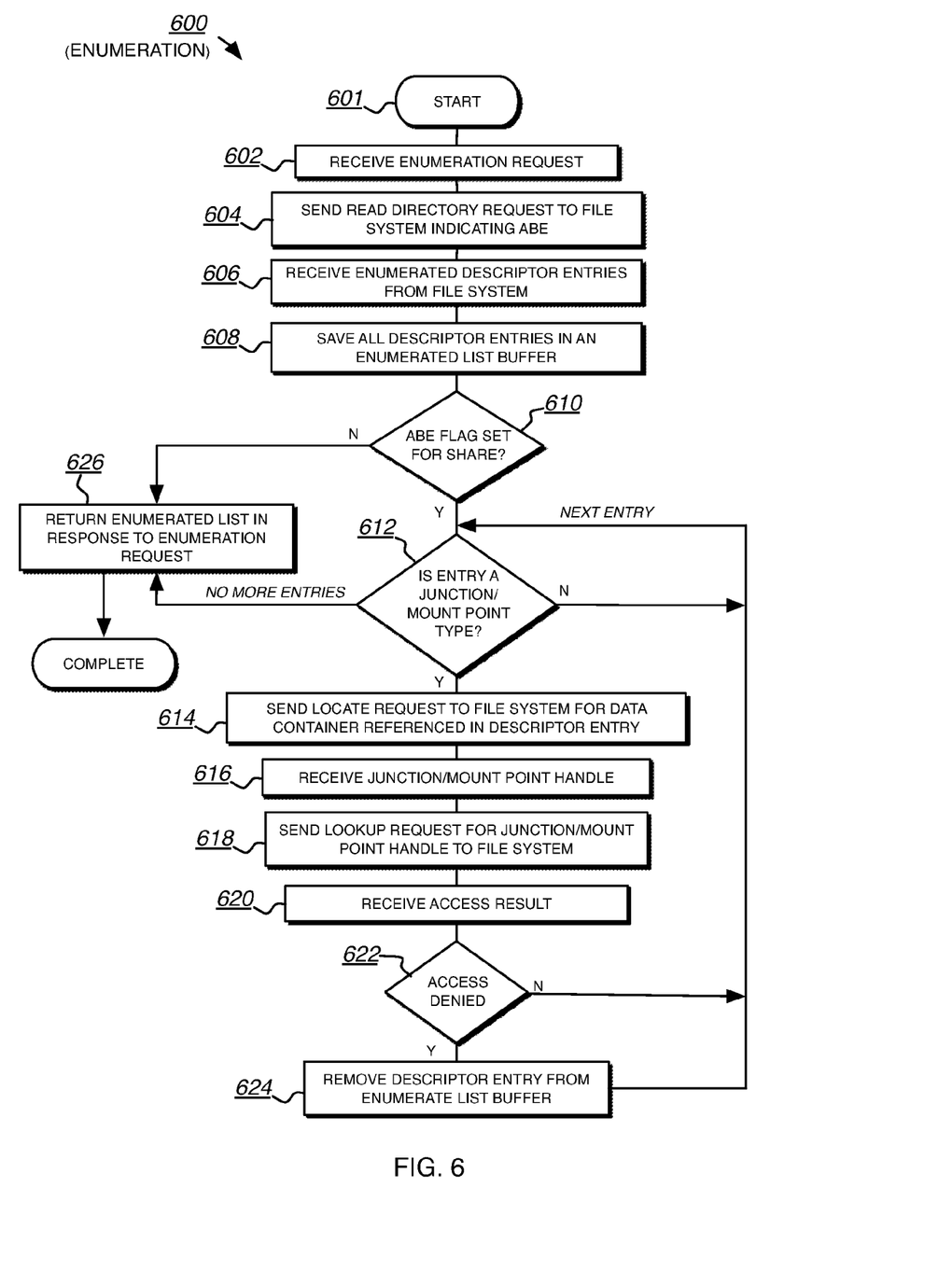
FIG. 6 is a flow chart detailing steps of a procedure for enumerating junctions entries.

FIG. 6 is a flow chart detailing steps of a procedure 600 performed by a protocol layer, e.g., enumerate module 321, in accordance with one or more embodiments described herein. The procedure begins at step 601 and continues to step 602 where the enumeration request 500 is received by the enumerate module 321 from the client 180 directed to an exported share by the cluster 100. At step 604, the enumerate module 321 sends a read directory request 504 to the file system 360. Illustratively, the read directory request 504 may also include an indicator, e.g., a USE_ABE flag 503, instructing that an access-based enumeration be performed. In alternative embodiments, the send request may be a function call or a system call. At step 606, the enumerate module 321 receives enumerated descriptor entries from the file system 360. These entries are illustratively saved in memory 224 as enumeration list 223 at step 608.

At step 610, a determination is made (e.g., by the enumerate module 321) as to whether an ABE flag for the share is set. If the ABE flag is not set, i.e., access-based enumeration is turned-off, then the contents of the enumeration list 223 are returned in response to the enumeration request 500 at step 626 and the procedure completes. If the ABE flag is set for the share (step 610), then each enumerated descriptor entry is examined in turn. At step 612, a determination is made (e.g., by the enumerate module 321) as to whether the enumerated descriptor entry is a junction or mount point (or wide symlink) type. If not, the procedure returns to step 612 to examine a next entry. However, if the enumerated descriptor entry is a junction or mount point type (or wide symlink), then steps 614 through 622 are performed.

At step 614 a LOCATE REQUEST 508 is sent to the file system 360 for the data container referenced in the descriptor entry, e.g., the junction volume reference 509. Thereafter, at step 616, a junction handle 511 is received. At step 618, a LOOKUP REQUEST 512 is sent to the file system 360 to perform an access check. A result of the access check is received (step 620), and if the result is ACCESS DENIED then the descriptor entry associated with the junction handle 511 is removed from the enumerated list 223 (step 624). Once all the descriptor entries have been examined, the contents of the enumerated list 223 are returned to the client 180 in response to the enumeration request 500 at step 626.

G. File System

Figure 7:
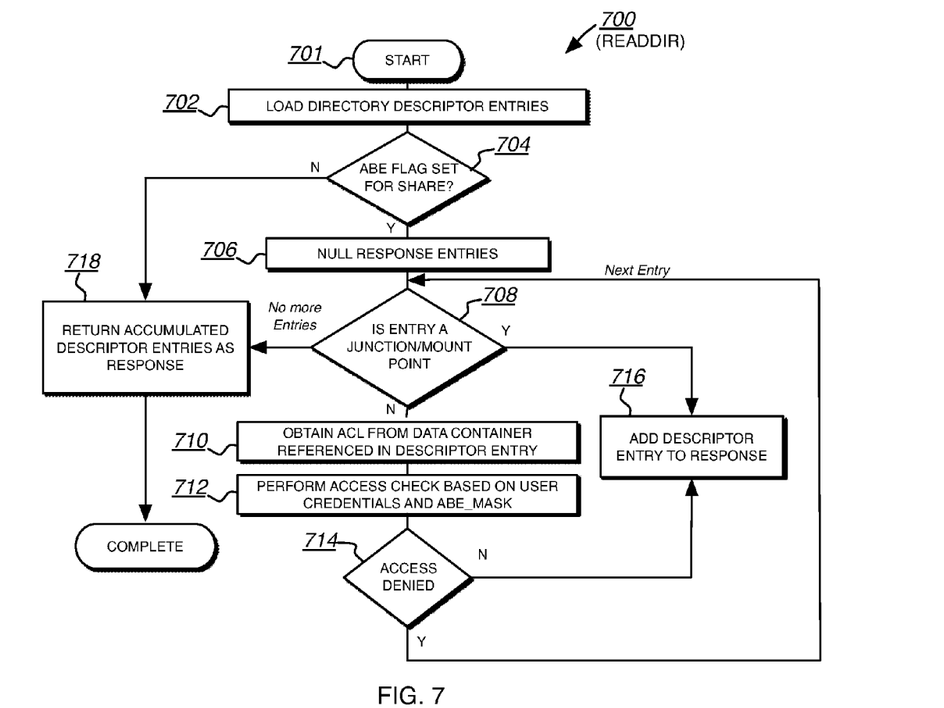
FIG. 7 is a flow chart detailing steps of a procedure for reading directory entries.

FIG. 7 is a flow chart detailing steps of procedure 700 for reading directory entries performed by module READDIR 362 in accordance with one or more embodiments described herein. The procedure begins at step 701 and continues to step 702 where directory descriptor entries are loaded, e.g., for directory 502. If the ABE flag is not set for the share (step 704), i.e., access-based enumeration is turned-off, then the entries are returned as a response at step 718 and the procedure completes. If the ABE flag is set for the share (step 704), then descriptor entries in a response are nulled, e.g., zeroed or null link list, at step 706. Steps 708 through 714 are then performed for each descriptor entry in the directory to determine whether the respective descriptor is added to a response. If an enumerated descriptor entry is a junction or mount point (or wide symlink) at step 708, then steps 710 through 714 are performed.

At step 710 the access permission, e.g., an access control list (ACL), for the data container referenced by the descriptor entry is obtained. An access check is performed based on the user credential 501, e.g., UID/GID or SID, and the ABE_mask 513 at step 712. Illustratively, this access check is performed with a bit-mask logical AND operation using the ABE_mask 513 and one or more portions of the user credential 501. In other embodiments a comparison operation may be performed. In still other embodiments, the access permission for the data container may include an ACL having multiple entries wherein is access checked, e.g., iteratively by entry, with the user credential 501.

If the result of the access check is not ACCESS DENIED (step 714) then the descriptor entry is added, e.g. accumulated, to the response at step 716. Once all the descriptor entries have been examined, the accumulated response is returned at step 718 and the procedure completes.

Figure 8:
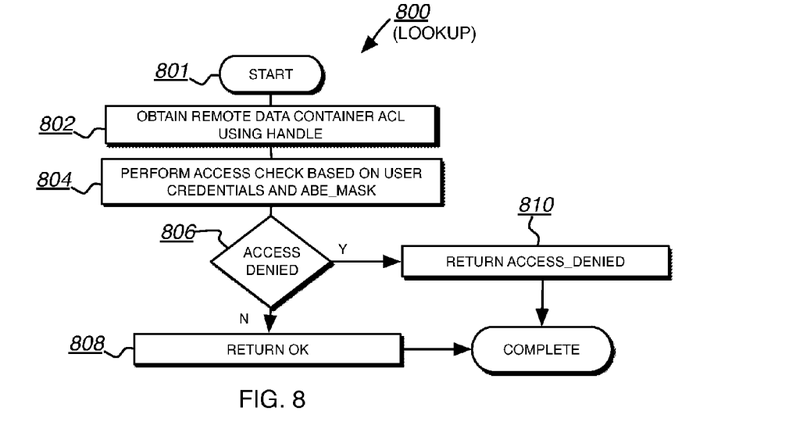
FIG. 8 is a flow chart detailing steps of a procedure for looking-up referenced data containers.

FIG. 8 is a flow chart detailing steps of procedure 800 for looking-up referenced data containers performed by module LOOKUP 366 in accordance with one or more embodiments described herein. The procedure begins at step 801.

At step 802 the access permission, e.g., ACL, for the data container referenced by the descriptor entry is obtained. An access check is performed based on the user credential 501, e.g., UID/GID or SID, and the ABE_mask 513 at step 804. This access check is illustratively performed with a bit mask AND operation of the ABE_mask 513 with one or more portions of the user credential 501. In another embodiment, the access permission for the data container may include an access control list having multiple entries each of which is access checked with the user credential 501. In a further embodiment, steps 710 and 712 of procedure 700 are identical to steps 802 and 804 respectively of procedure 800, e.g., the READDIR module 362 and the LOOKUP module 366 may share a subroutine.

If the result of the access check is ACCESS DENIED (step 806), then ACCESS DENIED is returned at step 810 and the procedure completes; otherwise OK, e.g., illustratively embodied as an integer having a value different from ACCESS DENIED, is returned at step 808 and the procedure completes.

H. Other Embodiments

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N- and D-blades are implemented in a single system. Alternately, the functions of the N and D-blades may be distributed among any number of separate systems wherein each system performs one or more of the functions.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

Furthermore, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:

receiving, using a hardware processor, an enumeration request directed to a data container on a first volume of a storage system, the enumeration request including a user credential, the data container including a descriptor associated with a redirection identifier referencing a second volume, the redirection identifier having a first access permission and the second volume having a second access permission different from the first access permission;

generating an enumeration response to the enumeration request that removes the descriptor from the enumeration response when the user credential has insufficient permission to access the second volume based on the second access permission so as to prevent visibility of a namespace associated with the second volume;

activating access-based enumeration for the namespace;

comparing the user credential to the second access permission using a first logical operation that includes a logical AND of the second access permission; and returning the enumeration response in response to the enumeration request.

2. The method of claim 1 further comprising:

generating an enumerated list of entries of a directory, the directory embodied as the data container; and removing an entry from the enumerated list of entries, the entry associated with the second volume, the enumerated list included in the enumeration response.

3. The method of claim 1 wherein the first volume is stored on a first collection of storage devices and second volume is stored on a second collection of storage devices different from the first collection of storage devices.

4. The method of claim 1 wherein the enumeration request includes a Common Internet File System (CIFS) protocol request.

5. The method of claim 2 wherein the user credential has sufficient permission to access the redirection identifier, and wherein the user credential has insufficient permission to access the second volume.

6. The method of claim 2 wherein the redirection identifier is selected from the group consisting of junction, mount point, and wide symlink.

7. The method of claim 2 further comprising:

locating the second volume;

accessing an access control list for the second volume;

comparing an entry of the access control list to the user credential, the entry including the second access permission; and determining whether the user credential has sufficient permission to access the second volume.

8. The method of claim 7 wherein comparing the entry of the access control list further comprises:

using the first logical operation with a bit mask, the bit mask including a second logical operation, the second logical operation having a logical OR of special permissions.

9. The method of claim 7 further comprising:

comparing each entry of the access control list to the user credential; and determining that the user credential has insufficient permission to access the second volume.

10. A storage system comprising:

a memory connected to a processor via a bus, the memory storing a storage operating system executable by the processor;

one or more storage devices coupled to the storage system;

a first volume and a second volume logically organized from the one or more storage devices;

a first file system included on the first volume, the first file system including a first directory;

a second file system included on the second volume, the second file system including a second directory;

a redirection identifier referencing the second directory on the second volume, the redirection identifier included in the first directory, the redirection identifier having a first access permission and the second volume having a second access permission different from the first access permission;

a descriptor included in the first directory, the descriptor associated with the redirection identifier; and the storage operating system when executed operable to:

receive an enumeration request directed to the first directory, the enumeration request including a user credential;

generate an enumeration response to the enumeration request, remove the descriptor from the enumeration response when the user credential has insufficient permission to access the second volume so as to prevent visibility of a namespace associated with the second volume;

activate access-based enumeration for the namespace;

compare the user credential to the second access permission using a first logical operation that includes a logical AND of the second access permission; and return the enumeration response in response to the enumeration request.

11. The storage system of claim 10 wherein the storage operating system when executed is further operable to:

generate an enumerated list of entries of the first directory; and remove an entry from the enumerated list of entries, the entry associated with the second directory, the enumerated list included in the enumeration response.

12. The storage system of claim 10 wherein the user credential has sufficient permission to access the redirection identifier, and wherein the user credential has insufficient permission to access the second directory.

13. The storage system of claim 10 further comprising:

a cluster of storage nodes, wherein the first volume is stored on a first storage node of the cluster and the second volume is stored on a second storage node different from the first storage node.

14. The storage system of claim 10 wherein the enumeration request includes a Common Internet File System (CIFS) protocol request.

15. The storage system of claim 10 wherein the redirection identifier is selected from the group consisting of junction, mount point, and wide symlink.

16. The storage system of claim 11 wherein the storage operating system when executed is further operable to:

locate the second volume;

access an access control list for the second directory;

compare an entry of the access control list to the user credential, the entry including the second access permission; and determine whether the user credential has sufficient permission to access the second directory.

17. The storage system of claim 16 wherein the storage operating system when executed is further operable to:

use the first logical operation with a bit mask, the bit mask including a second logical operation, the second logical operation having a logical OR of special permissions.

18. The storage system of claim 16 wherein the storage operating system when executed is further operable to:
   compare each entry of the access control list to the user credential; and
   determine that the user credential has insufficient permission to access the second directory.

19. The storage system of claim 13 wherein the storage operating system when executed is further operable to:
   send a lookup request to the second storage node of the cluster, the lookup request directed to the second directory, the lookup request including the user credential; and
   receive a lookup response to the lookup request, the lookup response including a status determining whether the user credential has permission to access the second directory.

20. A non-transitory computer readable medium including program instructions for execution on one or more processors, the program instructions when executed operable to:
   receive an enumeration request directed to a data container on a first volume of a storage system, the enumeration request including a user credential, the data container including a descriptor associated with a redirection identifier referencing a second volume, the redirection identifier having a first access permission and the second volume having a second access permission different from the first access permission;
   generate an enumeration response to the enumeration request that removes the descriptor from the enumeration response when the user credential has insufficient permission to access the second volume so as to prevent visibility of a namespace associated with the second volume;
   activate access-based enumeration for the namespace;
   compare the user credential to the second access permission using a logical AND operation of the second access permission; and
   return the enumeration response in response to the enumeration request.

* * * * *